(12) United States Patent  
Thurgate et al.

(10) Patent No.: US 11,928,396 B2  
(45) Date of Patent: Mar. 12, 2024

(54) METHOD FOR QUANTIFYING VISUAL DIFFERENCES IN AUTOMOTIVE AERODYNAMIC SIMULATIONS

(71) Applicant: TOYOTA MOTOR ENGINEERING & MANUFACTURING NORTH AMERICA, INC., Plano, TX (US)

(72) Inventors: Brian T. Thurgate, Ypsilanti, MI (US); Daniel B. Gidcumb, West Bloomfield, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1027 days.

(21) Appl. No.: 16/556,956

(22) Filed: Aug. 30, 2019

(65) Prior Publication Data

US 2021/0064721 A1   Mar. 4, 2021

(51) Int. Cl.
  *G06F 30/15*   (2020.01)
  *G06F 30/20*   (2020.01)
  (Continued)

(52) U.S. Cl.
  CPC .............. *G06F 30/15* (2020.01); *G06F 30/20* (2020.01); *G06F 2111/10* (2020.01); *G06F 2119/10* (2020.01)

(58) Field of Classification Search
  CPC .......... G06F 30/15; G06F 30/20; G06F 30/12; G06F 30/28; G06F 2111/10; G06F 2119/10
  See application file for complete search history.

(56) References Cited

U.S. PATENT DOCUMENTS 7,912,687 B2    3/2011   Stockner et al.
2010/0318327 A1*  12/2010  Holden ............... G06F 30/15
                                          703/2
(Continued)

FOREIGN PATENT DOCUMENTS

CN    104361174 A   2/2015
CN    107918709 A   4/2018
(Continued)

OTHER PUBLICATIONS

Edeling, Wouter Nico, et al. "Bayesian estimates of parameter variability in the k-ε turbulence model." Journal of Computational Physics 258 (2014): 73-94. (Year: 2014).*

(Continued)

*Primary Examiner* — Boris Gorney
*Assistant Examiner* — Joshua E. Jensen
(74) *Attorney, Agent, or Firm* — HAYNES AND BOONE, LLP

(57) ABSTRACT

Disclosed is a method for evaluating computational fluid dynamic simulation results. The method includes: performing at least two baseline runs of a simulated area or volume containing a first vehicle body shape using a set of initial conditions, performing a change run using a second vehicle body using the set of initial conditions, creating a noise map based on differences between the second baseline run and the first baseline run, creating a change map based on differences between the change run and a selected baseline run, and comparing the change map to the noise map.

20 Claims, 16 Drawing Sheets

(51) Int. Cl.
*G06F 111/10* (2020.01)
*G06F 119/10* (2020.01)

(56) References Cited

U.S. PATENT DOCUMENTS

| | | | |
|---|---|---|---|
| 2013/0080984 A1* | 3/2013 | Liu | H01L 22/20 |
| | | | 716/112 |
| 2015/0261648 A1* | 9/2015 | Malani | G06F 11/3062 |
| | | | 703/21 |
| 2016/0249487 A1 | 8/2016 | Bhagwat et al. | |
| 2020/0082041 A1* | 3/2020 | Albert | G06N 3/084 |
| 2020/0113534 A1* | 4/2020 | Fischer | A61B 6/5258 |
| 2020/0364388 A1* | 11/2020 | Umetani | G06T 17/20 |

FOREIGN PATENT DOCUMENTS

| | | | | |
|---|---|---|---|---|
| WO | WO-2009087803 A1 * | 7/2009 | | B60C 11/0318 |
| WO | WO-2017044074 A1 * | 3/2017 | | E21B 41/0092 |

OTHER PUBLICATIONS

Raffel, Markus, et al. "Applications of density tagging velocimetry." Proceedings of the 16th international symposium on applications of laser techniques to fluid mechanics, Lisbon, Portugal. No. CONF. 2012. (Year: 2012).*

Kim, Uije, et al. "Simulation Method to meet new pass-by noise requirements." Sound & Vibration/September (2015). (Year: 2015).*

* cited by examiner

FOR EACH VARIABLE IN EACH CELL, IF
MORE THAN 2 BASE CASES ARE RUN

1500 →
Base_delta1=base1-base2
Base_delta2=base1-base3
Base_delta3=base2-base3

Option 1 (conservative):
Base_delta=max(base_delta1, base_delta2, base_delta3)

Option 2
Base_delta=avg(base_delta1, base_delta2, base_delta3)

Option 3
Apply statistics (such as offsetting by confidence interval)

Fig. 15

FOR EACH VARIABLE IN EACH CELL

1600 →
Base_Delta=abs(Base1-Base2)
Delta_Raw=abs(Case1-Base1)
If delta_Raw ≤ base_delta then delta_adj=0
If delta_Raw > base_delta then delta_adj=delta_raw-base_delta

Fig. 16

METHOD FOR QUANTIFYING VISUAL DIFFERENCES IN AUTOMOTIVE AERODYNAMIC SIMULATIONS

TECHNICAL FIELD

The subject matter described herein relates to a method for quantifying expected differences between computational fluid dynamic simulations of a vehicle body. This method has particular but not exclusive utility for the evaluation of motor vehicle body designs.

BACKGROUND

The computational fluid dynamics (CFD) may be used for example in assessing different cooling configurations for an HVAC system, and for assessing the fluid properties of dynamic components such as propellers and valves. In the automotive industry, CFD is employed to evaluate the airflow and drag characteristics of different vehicle body designs without the need for wind tunnel testing of physical models. CFD may be used in particular to determine which of two or more body designs has the most favorable flow and drag characteristics. Such CFD simulations, however, have numerous drawbacks, including run-to-run variability even when the vehicle body design and simulation conditions are identical.

Aerodynamic CFD simulations of vehicle bodies in the automotive industry are performed using cellular automaton type simulations (e.g., lattice Boltzmann type) using software tools such as PowerFLOW. However, because such systems rely on inherently transient solvers, there is very often a difference between successive runs, even when the same geometry is run with the same conditions and settings. Therefore, it can be difficult to determine what is a true flow variation due to changes in vehicle body geometry and what is just "noise" due to natural or statistical variance in the simulation. All transient CFD solvers with run-to-run variation may exhibit this problem.

Traditionally, these run-to-run differences are assessed based on the intuition and experience of engineers, who decide what is a meaningful change vs. what is "noise". Often this means concentrating on differences that occur in (and downstream of) areas where changes are made. However, such judgments are subjective and may be susceptible to confirmation bias. In design environments where every flow difference is considered "significant", two issues are commonplace: 1) reduced trust in CFD results, since flow differences may be seen in areas unrelated to the parts being studied or modified, and 2) improper or premature conclusions based on mistaking normal run-to-run variation for meaningful design differences. In design environments where flow differences are judged insignificant, engineers run the risk of failing to notice or acknowledge changes in a vehicle body design that do in fact yield meaningful differences in drag or airflow. This can add costs and reduce vehicle gas mileage. Accordingly, a need exists for improved CFD processes and methods that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a method for quantifying expected differences between computational fluid dynamic (CFD) simulations of a vehicle body, hereinafter referred to as a CFD noise map subtraction method. The CFD noise map subtraction method disclosed herein has particular, but not exclusive, utility for the design of aerodynamic shapes for automobile and truck bodies and body parts. The CFD noise map subtraction method includes a method for evaluating computational fluid dynamic and computer aided engineering simulation results, the method including: providing a first vehicle body shape to be simulated; providing a set of initial conditions; performing a first baseline run and a second baseline run of a simulated area or volume containing the first vehicle body shape using the set of initial conditions; performing a change run using a second vehicle body using the set of initial conditions for each point within the simulated area or volume; creating a noise map based on differences between the second baseline run and the first baseline run; creating a change map based on differences between the change run and a selected baseline run selected from the first baseline run or the second baseline run; and comparing the change map to the noise map. Other embodiments of this aspect include corresponding computer systems, apparatus, and computer programs recorded on one or more computer storage devices, each configured to perform the actions of the methods.

Implementations may include one or more of the following features. The method where comparing the change map to the noise map involves discounting changes that occur in the change map at points where noise exists in the noise map. The method where comparing the change map to the noise map involves disregarding changes that occur in the change map at points where noise exists in the noise map. The method where comparing the change map to the noise map involves setting a value of the change map at each given point to zero if a value of the noise map at the given point is greater than the value of the change map. The method where, after setting a value of the change map at each given point to zero if the value of the noise map at the given point is greater than the value of the change map, the change map shows only changes between the change run and the selected baseline run that exceed the value of the noise map. The method where all of the changes shown in the change map, after setting a value of the change map at each given point to zero if the value of the noise map at the given point is greater than the value of the change map, the changes shown in the change map are all considered statistically significant. The method further including: performing additional baseline runs; and for each point within the simulated area or volume: creating the noise map based on a standard deviation of values from the first baseline run, the second baseline run, and the additional baseline runs; creating the change map based on differences between the change run and an average of values from the first baseline run, the second baseline run, and the additional baseline runs, where the selected baseline run is an average of the first baseline run, second baseline run, and additional baseline runs, and where a value of the point for the selected baseline run is the average of the value for the first baseline run, the second baseline run, and the additional baseline runs. The method where comparing the change map to the noise map involves visually comparing the change map to the noise map, and discounting changes that occur in the change map at points where noise exists in the noise map. The method where comparing the change map to the noise map involves visually comparing the change map to the noise map, and disregarding changes that occur in the change map at points where noise exists in the noise map. The method where comparing the change map to the noise map involves setting a value of the change map at a given point to zero if the value of the noise map at the given point is greater than the value of the change map. The method where, after setting a value of the change map at each given point to zero if the value of the noise map at the given point is greater than the value of the change map, the change map shows only changes between the change run and the selected baseline run that exceed the value of the noise map. The method where, after setting a value of the change map at each given point to zero if the value of the noise map at the given point is greater than the value of the change map, all of the changes shown in the change map are all considered statistically significant. Implementations of the described techniques may include hardware, a method or process, or computer software on a computer-accessible medium.

One general aspect includes a system for testing the fluid dynamic characteristics of body shapes of a vehicle, the system including: a processor including: a memory; a display; a user interface configured to receive inputs from a user, where the processor is configured to: receive a first body shape of a vehicle to be simulated; receive a set of initial conditions; perform a first baseline run and a second baseline run of a simulated area or volume containing the first body shape of the vehicle using the set of initial conditions; perform a change run using a second vehicle body shape using the set of initial conditions; and for each point within the simulated area or volume: create a noise map based on differences between the second baseline run and the first baseline run; create a change map based on differences between the change run and a selected baseline run selected from the first baseline run or the second baseline run; and compare the change map to the noise map. Other embodiments of this aspect include corresponding computer systems, apparatus, and computer programs recorded on one or more computer storage devices, each configured to perform the actions of the methods.

Implementations may include one or more of the following features. The system where comparing the change map to the noise map involves setting a value of the change map at each given point to zero if a value of the noise map at the given point is greater than the value of the change map. The system where, after setting a value of the change map at each given point to zero if the value of the noise map at the given point is greater than the value of the change map, the change map shows only changes between the change run and the selected baseline run that exceed the value of the noise map. The system where all of the changes shown in the change map, after setting a value of the change map at each given point to zero if the value of the noise map at the given point is greater than the value of the change map, the changes shown in the change map are all considered statistically significant. The system where the processor is further configured to: perform additional baseline runs; and for each point within the simulated area or volume: create the noise map based on a standard deviation of values from the first baseline run, the second baseline run, and the additional baseline runs; create the change map based on differences between the change run and an average of values from the first baseline run, the second baseline run, and the additional baseline runs, where the selected baseline run is an average of the first baseline run, second baseline run, and additional baseline runs, and where a value of the point for the selected baseline run is the average of the value for the first baseline run, the second baseline run, and the additional baseline runs. The system where comparing the change map to the noise map involves setting a value of the change map at each given point to zero if a value of the noise map at the given point is greater than the value of the change map. The system where, after setting a value of the change map at each given point to zero if the value of the noise map at the given point is greater than the value of the change map, the change map shows only changes between the change run and the selected baseline run that exceed the value of the noise map. The system further including the vehicle. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the CFD noise map subtraction method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 15 is an example algorithm for determining a noise map for each point in the simulated area or volume, in accordance with at least one embodiment of the present disclosure.

FIG. 16 is an example algorithm for determining a noise-subtracted difference map for each point in the simulated area or volume, in accordance with at least one embodiment of the present disclosure.

DETAILED DESCRIPTION

Figure 1:
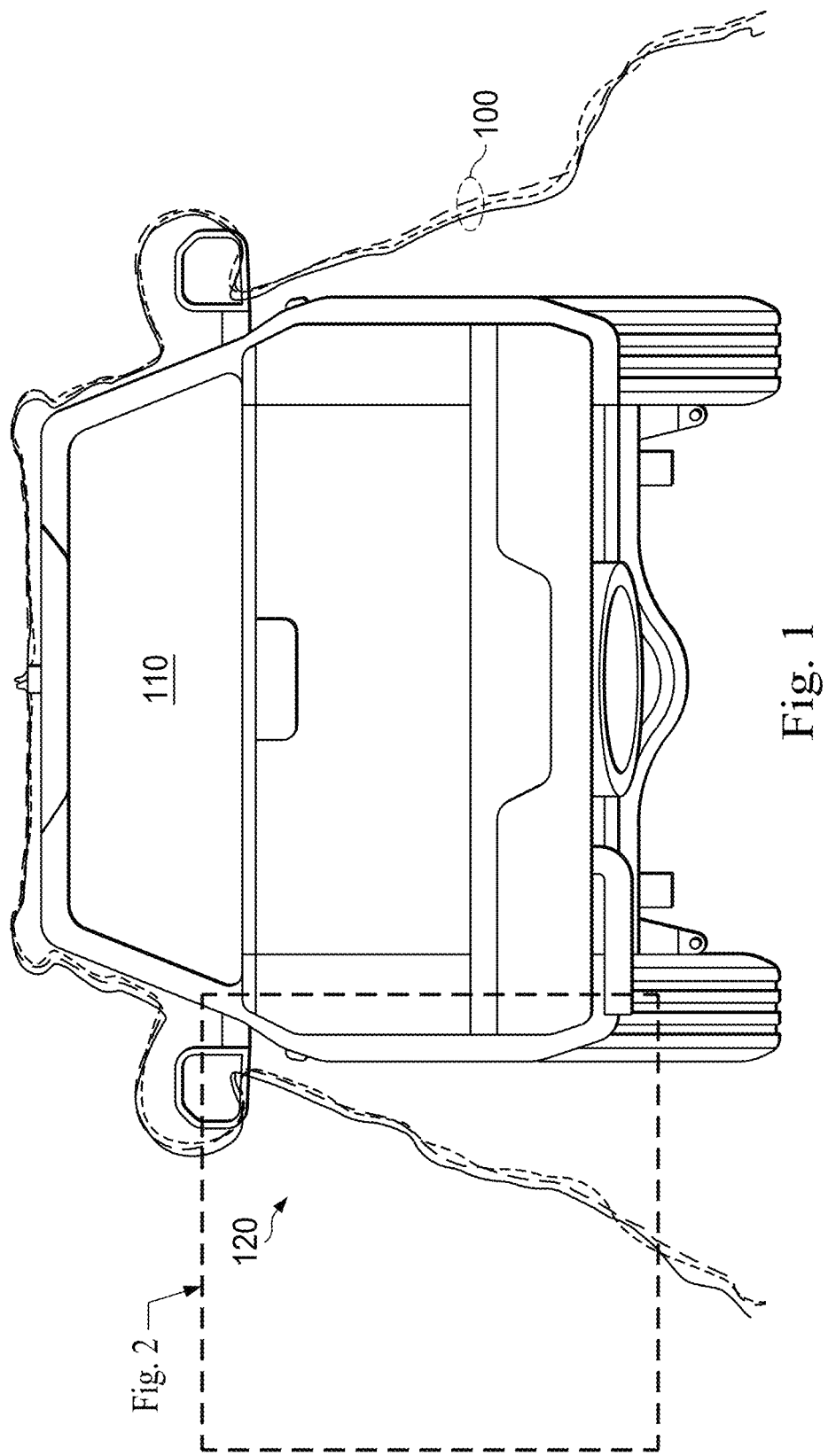
FIG. 1 is a representation of three instances of an example aerodynamic boundary layer surrounding an example vehicle, as determined by a CFD simulation, in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with at least one embodiment of the present disclosure, a CFD noise map subtraction method is provided which permits an algorithm or engineer or other user to evaluate the changes that appear in a CFD model when a change in vehicle body design is implemented. The CFD noise map subtraction method helps to quantify which changes in airflow or drag are statistical noise introduced by the transient CFD solver, and which changes are meaningful results of the altered vehicle body design.

Traditionally, run-to-run differences for a CFD model of an altered body design are assessed based on the intuition and experience of engineers, who typically concentrate on differences that occur in (and downstream of) areas where changes are made, and ignore drag and airflow differences around (and downstream of) other portions of the vehicle body. However, such judgments are subjective and may be highly susceptible to confirmation bias, reduced trust in CFD results, improper or premature conclusions, and failure to notice or acknowledge some meaningful changes.

By creating a reference image of expected stochastic variation for a given model, the present disclosure can eliminate much of the guesswork associated with interpreting CFD results. This may not only lessen the workload for engineers, but also improve overall effectiveness of the CFD simulation by reducing the time spent chasing false leads.

A heat map is a representation of a variable in space. Heat maps are used to better communicate spatial relationships for the variable, and draw attention to regions of greater significance and away from regions of lesser significance. Examples of heat maps include 2D and 3D maps for a given variable in a CFD simulation volume (e.g., a scalar velocity at each X-Y coordinate). In accordance with at least one embodiment of the present disclosure, a change map is a heat map where the variable being plotted is the change of another variable (e.g., a change in scalar velocity at a given point between two different simulations). In accordance with at least one embodiment of the present disclosure, a noise map is a specific type of change map, wherein the change being plotted is run-to-run variation for otherwise similar simulation conditions.

In some embodiments, a "noise map subtraction" can be made. This may take many forms, such as a reference image or heat map of the run-to-run variation vs. the studied case, or a set of reference lines or markers that can be overlaid onto the latest results. These reference lines or markers can then be used by an algorithm to judge if the change from the baseline falls within "normal" variation, or if it is in fact a meaningful change. In other embodiments, simple comparison tools can be built either by making simple overlays or through a more automated process. The key is that a baseline run must be executed at least twice, and preferably many times, to be able to understand/visualize the run-to-run variation. When analyzing CFD results of a change in vehicle body shape, this baseline could be queried (either by a human or by an algorithm) to determine the likelihood that a given change is simply normal statistical variation, or whether it is a meaningful and actionable difference.

By referring to the noise map subtraction, engineers have an easy reference to tell what is expected or acceptable as run-to-run variation, and what is a meaningful change. The more easily this can be applied to the current run (such as something that can be overlaid, or a quantification of differences expected), the easier the analysis becomes, and more confidence can be placed in the CFD results. Accordingly, statistical CFD is employed to create a statistical boundary model or image overlay markers for a particular vehicle body under a particular set of conditions. Using the statistical boundary model or image overlay markers as a comparison for CFD flow models around an altered body form, algorithms or engineers and other users are provided with a straightforward reference indicating which differences are to be considered. Altered flow parameters that fall outside the identified statistical boundaries or image overlay markers may be considered meaningful, whereas altered flow parameters that fall within the identified statistical boundaries or image overlay markers may be considered "noise." The same process can be applied to other computer-aided engineering (CAE) simulations that output 2D or 3D heat maps of simulated variables and that exhibit run-to-run variation.

The present disclosure aids substantially in the quantitative evaluation of changes in a motor vehicle body design, by improving understanding and visualization of the expected range of statistical run-to-run variation in the CFD or CAE simulation due to solver noise. Implemented on a processor in communication with a video display, the CFD noise map subtraction method disclosed herein provides practical visual thresholds for which flow differences should be analyzed and which should be ignored as noise. This improved analysis of CFD results transforms a process of guesswork and intuition into a simple visual comparison of change magnitudes, without the normally routine need to perform multiple confirmation runs and/or apply subjective engineering judgment. This unconventional approach improves the functioning of the CFD-assisted design process, by providing greater confidence in CFD results without requiring significant additional human labor or processing time.

The CFD noise map subtraction method may output an image overlay superimposed on the CFD results. The image overlay is viewable on a display, and operated by a control process executing on a processor that accepts user inputs (e.g., from a keyboard, mouse, or touchscreen interface), and that is in communication with one or more CFD simulations or the outputs thereof. In that regard, the control process performs certain specific operations in response to different inputs or selections made at different times during the design and analysis process. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the CFD noise map subtraction method. Certain features may be added, removed, or modified without departing from the spirit of the claimed subject matter.

FIG. 1 is a representation of three instances of an example aerodynamic boundary layer 100 surrounding an example vehicle 110, as determined by a CFD simulation, in accordance with at least one embodiment of the present disclosure. The boundary layer is the point at which air flow relative to the vehicle is close to zero, e.g., the region or layer in which the air remains essentially attached to the vehicle rather than static with the landscape through which the vehicle 110 is moving. In general, a smaller boundary layer is associated with lower drag and therefore greater fuel economy. A detail box 120 is marked for closer view.

Before continuing, it should be noted that the examples described above are provided for purposes of illustration, and are not intended to be limiting. Other devices and/or device configurations may be utilized to carry out the operations described herein.

Figure 2:
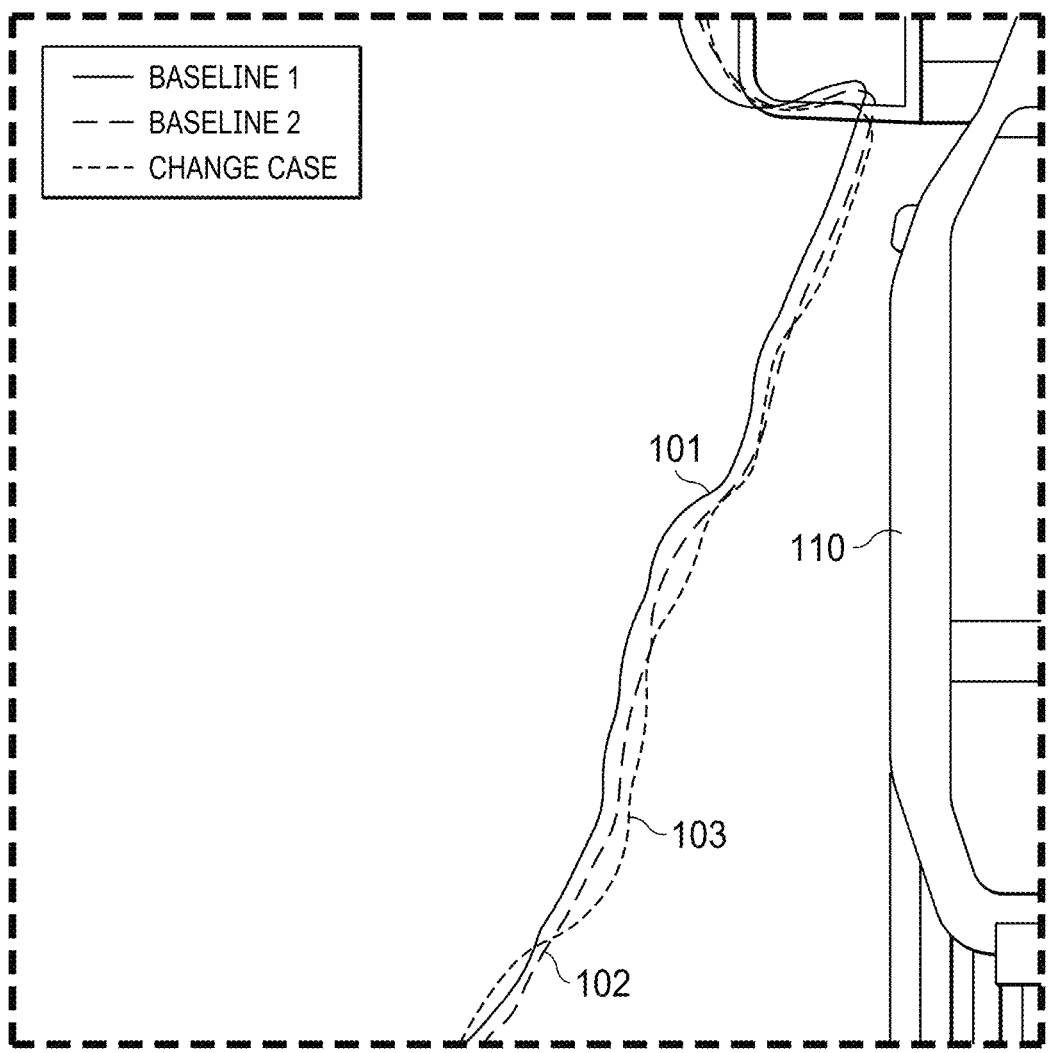
FIG. 2 is a representation of three instances of an example aerodynamic boundary layer surrounding an example vehicle, as determined by a CFD simulation, in accordance with at least one embodiment of the present disclosure.

FIG. 2 is a representation of three instances of an example aerodynamic boundary layer 100 surrounding an example vehicle 110, as determined by a CFD simulation, in accordance with at least one embodiment of the present disclosure. This view is a closer view of the detail box 120 from FIG. 1, and shows more clearly three separate boundary layers: a Baseline #1 case 101, a Baseline #2 case 102 that was run with identical settings and inputs but exhibits small run-to-run differences, and a Change Case 103, that represents the boundary layer for a slightly adjusted aerodynamic shape for the vehicle 110. Such cases are sometimes referred to as "countermeasure" cases, because they include proposed design changes intended to alleviate a known problem, such as turbulence (and therefore drag) downstream of a vehicle body part (e.g., a door handle, side view mirror, or bumper). In this example the countermeasure case 103 shows the boundary layer being closer to the vehicle in several key locations than either of the baseline cases 101 or 102.

Figure 3A:
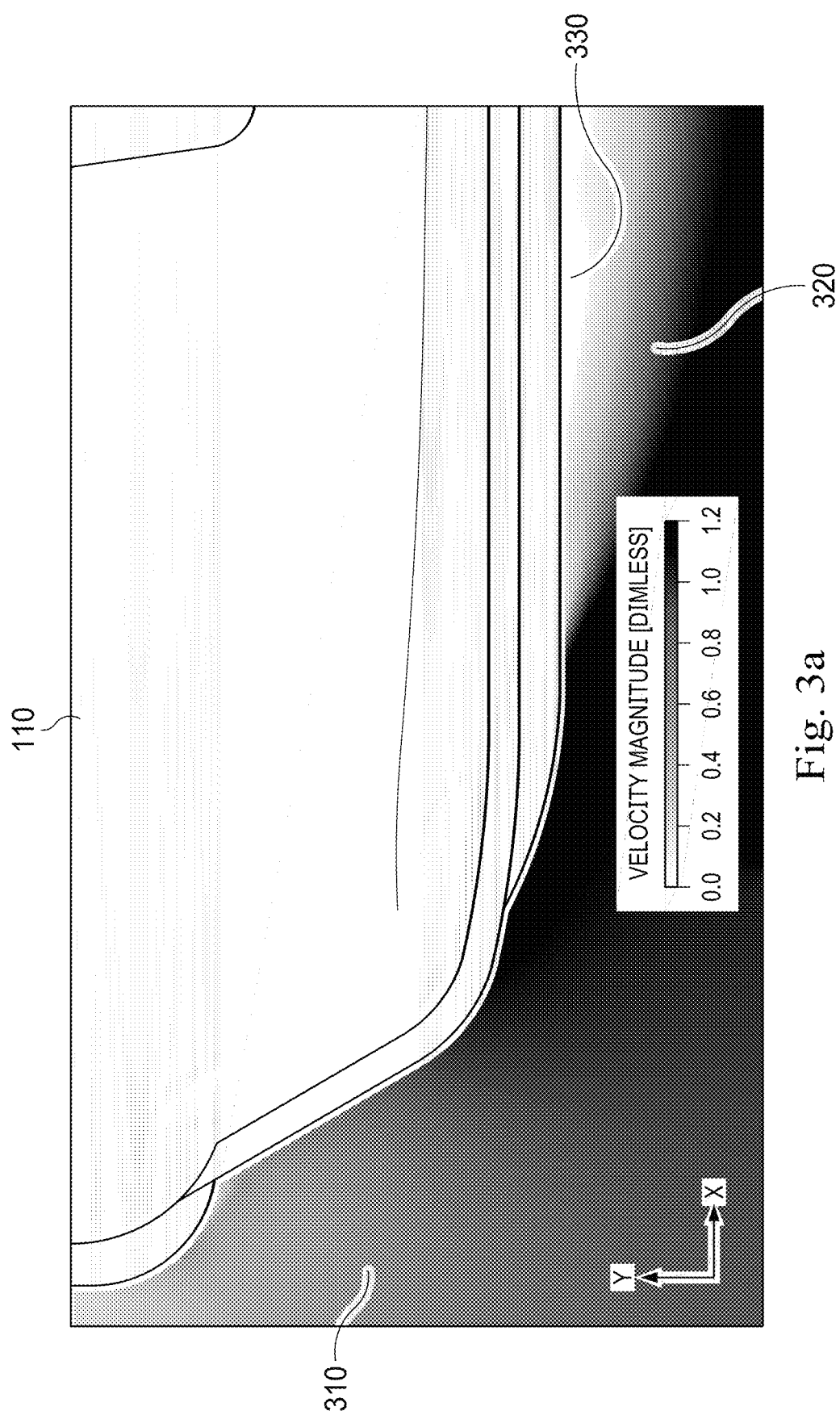
FIG. 3a and FIG. 3b are top views of a velocity field output for a CFD run of an example vehicle, for two different baseline cases, in accordance with at least one embodiment of the present disclosure.
Figure 3B:
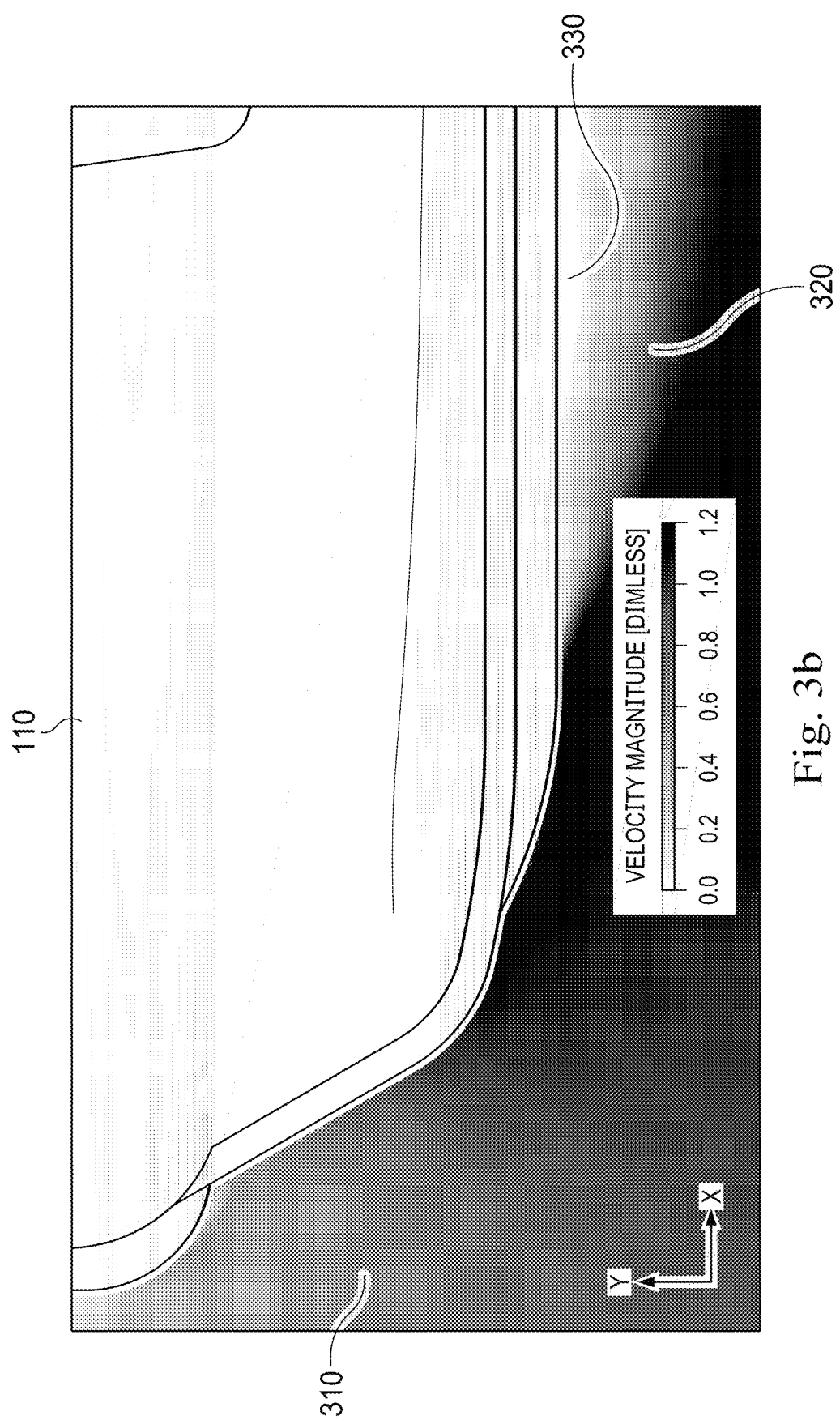

FIG. 3a and FIG. 3b are top views of a velocity field output 310 for a CFD run of an example vehicle 110, for two different baseline cases, in accordance with at least one embodiment of the present disclosure. These two velocity fields 310 are similar, but show slight run-to-run differences. For example, visible in each case is a color 1 transition line 320 and a color 2 transition line 330, representing dimensionless velocities of 1.1 and 0.2, respectively, on a scale from 0.0 to 1.2. These two transition lines occur at slightly different places in FIG. 3a vs. FIG. 3b.

Figure 4:
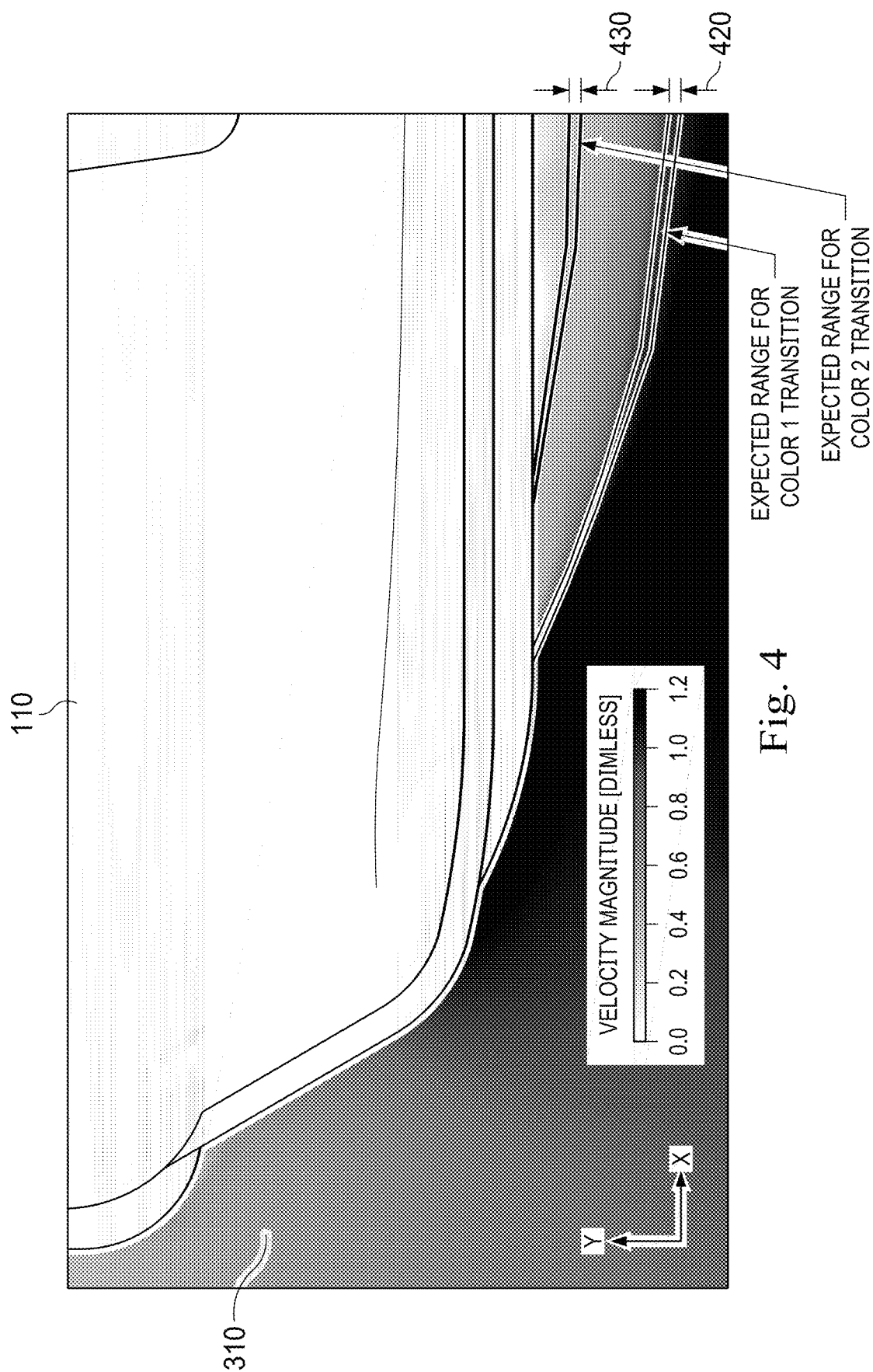
FIG. 4 is a top view of a velocity field output for a CFD run of an example vehicle, in accordance with at least one embodiment of the present disclosure.

FIG. 4 is a top view of a velocity field output 310 for a CFD run of an example vehicle 110, in accordance with at least one embodiment of the present disclosure. In FIG. 4, a pair of black lines 420 have been added to mark the positions of the color 1 transition line in the two baseline runs from FIG. 3a and FIG. 3b. These lines 420 and the space between them represent an expected range for the color 1 transition 320 based on the run-to-run variation observed between the two baseline cases. Thus, any change cases (e.g., countermeasure cases), run against the same vehicle with a slightly altered aerodynamic shape, can be evaluated based on whether they show a color 1 transition 320 within this region 420 (in which case the change is not aerodynamically significant in this region), or outside this region 420 (in which case the change has produced a meaningful difference in the velocity field surrounding the vehicle, beyond what would be expected for simple run-to-run variation. Similarly, a pair of lines 430 mark the expected range of the color 2 transition 330 as described above. Any change case that produces a color 2 transition 330 outside of this range 430 may be considered aerodynamically meaningful (e.g., by changing the size or shape of the boundary layer 100, which is related to the color 2 transition 330), whereas any change that leaves the color 2 transition 330 within the expected range 430 may be considered aerodynamically insignificant in this region.

Figure 5:
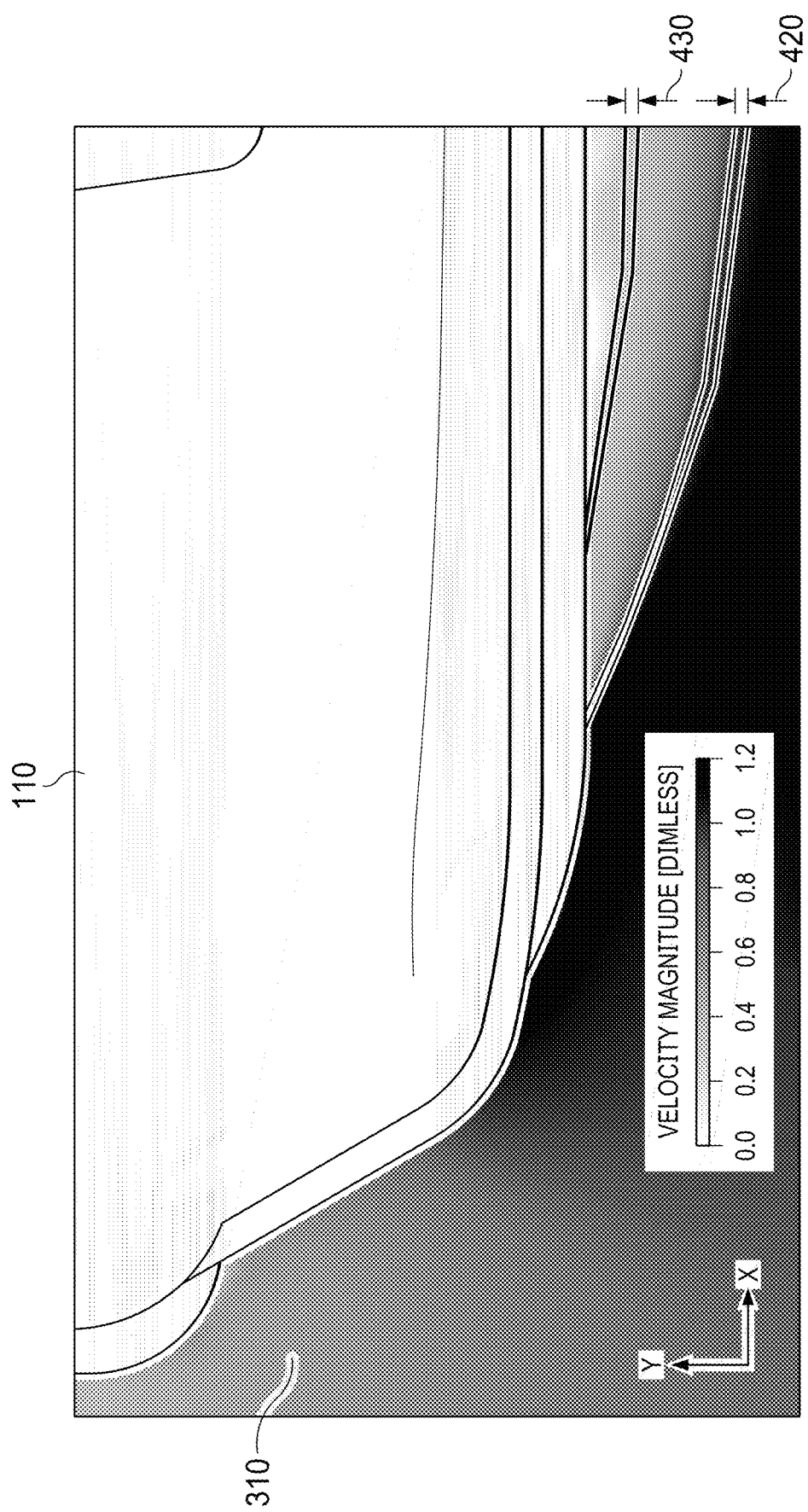
FIG. 5 is a top view of a velocity field output for a CFD run of an example vehicle, in accordance with at least one embodiment of the present disclosure.

FIG. 5 is a top view of a velocity field output 310 for a CFD run of an example vehicle 110, in accordance with at least one embodiment of the present disclosure. This velocity field 310 represents a change case. However, as can be seen in the figure, the color 2 transition 330 occurs within the expected range 430, and the color 1 transition 320 occurs within the expected range 420. Therefore, this change case can be classified as aerodynamically insignificant.

Figure 6:
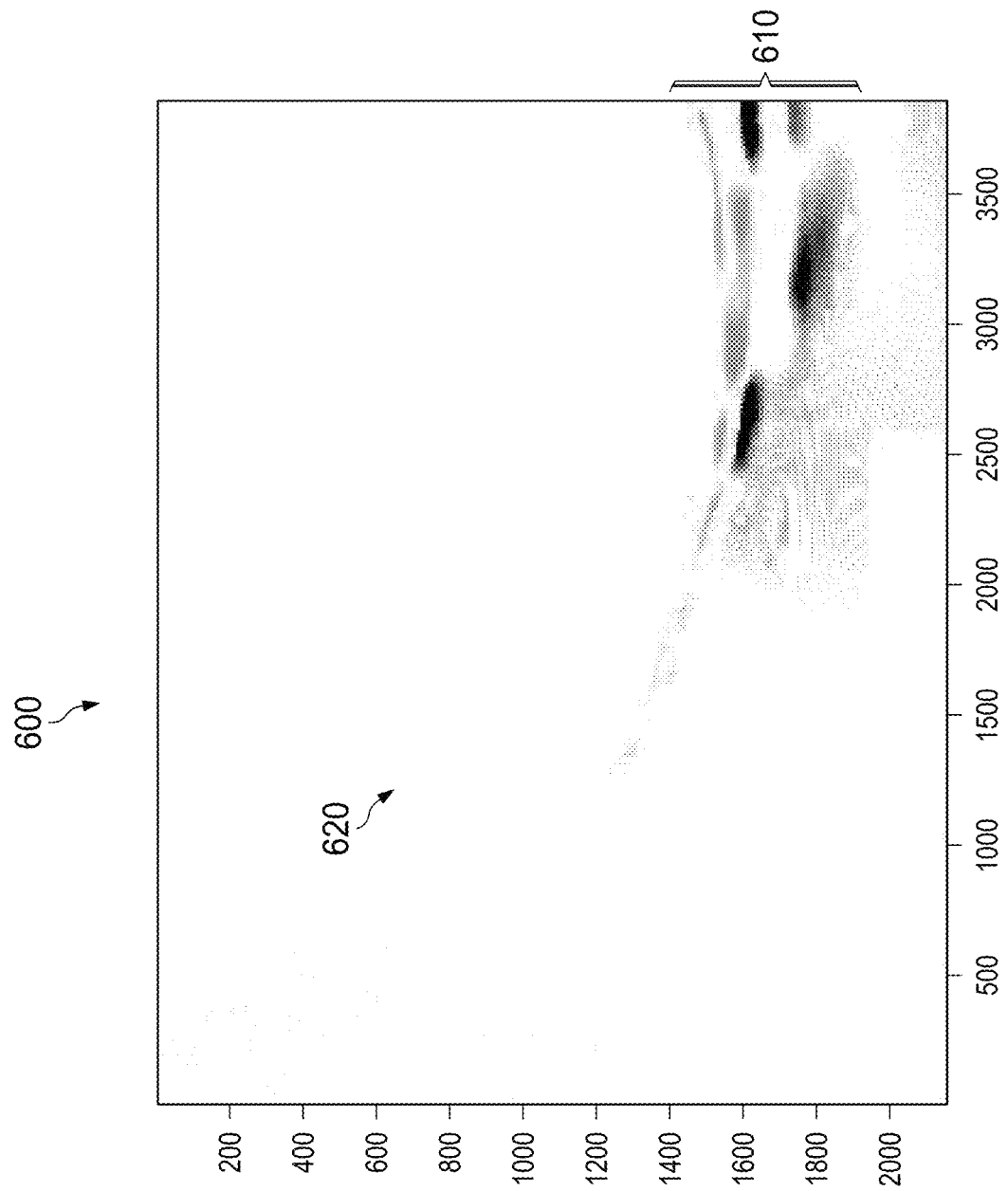
FIG. 6 is a velocity field subtraction image, in accordance with at least one embodiment of the present disclosure.

FIG. 6 is a velocity field subtraction image 600, in accordance with at least one embodiment of the present disclosure. The velocity field subtraction image 600 represents the velocity field 330 of one baseline case numerically subtracted from the velocity field 330 of a second baseline case. The subtraction image 600 includes colored regions 610 that represent a noise map, i.e., a 2D map showing where run-to-run variation occurs within the velocity field 330. This subtraction image 600 can for example be overlaid on top of the velocity field 330 of a countermeasure case, or compared against a subtraction image of the countermeasure case minus the baseline case. Any flow changes that occur in the colored or noisy regions 610 may be considered less consequential than changes that occur in the white space 620 of the subtraction image 600, and may be discounted accordingly or else disregarded altogether. Subtraction images may also be created for other simulated variables, as described below.

Figure 7:
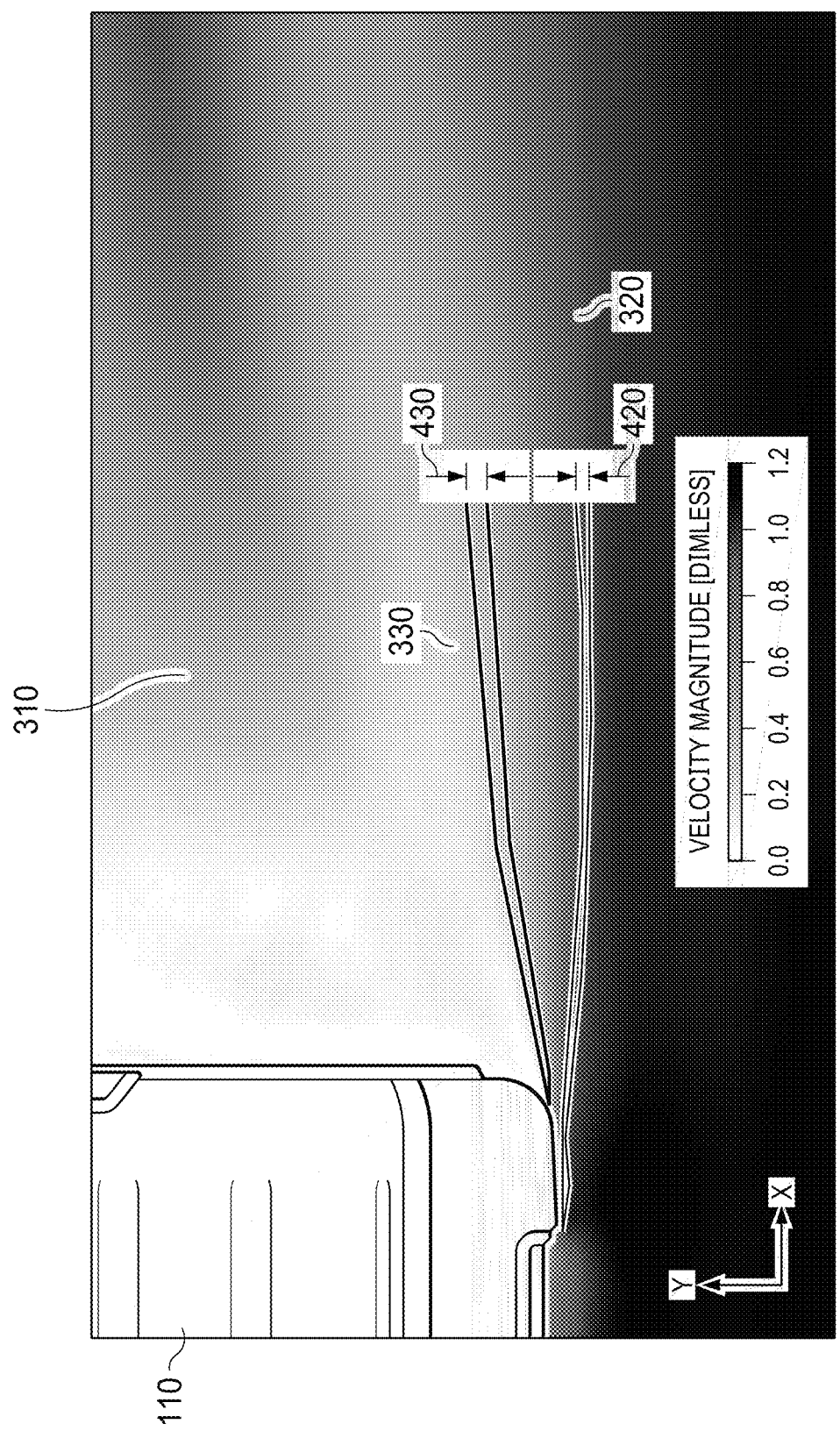
FIG. 7 is a top view of a velocity field output for a CFD run of an example vehicle, in accordance with at least one embodiment of the present disclosure.

FIG. 7 is a top view of a velocity field output 310 for a CFD run of an example vehicle 110, in accordance with at least one embodiment of the present disclosure. In this view of a baseline #3 CFD run, the color 1 transition 320 falls slightly outside the expected range 420, and the color 2 transition 330 falls slightly outside the expected range 430, where the expected ranges were developed from two different baseline runs. The fact that a third baseline run produces transitions 320 and 330 outside of the expected ranges 420 and 430 indicates that more baseline runs are needed in order to define the expected ranges with confidence. In such a case, the expected ranges 420 and 430 are expanded to accommodate the third baseline run, and fourth baseline run can be made. When the transitions 320 and 330 for additional baseline runs no longer fall outside the expected ranges 420 and 430, confidence increases that the expected ranges may be considered adequate.

Figure 8:
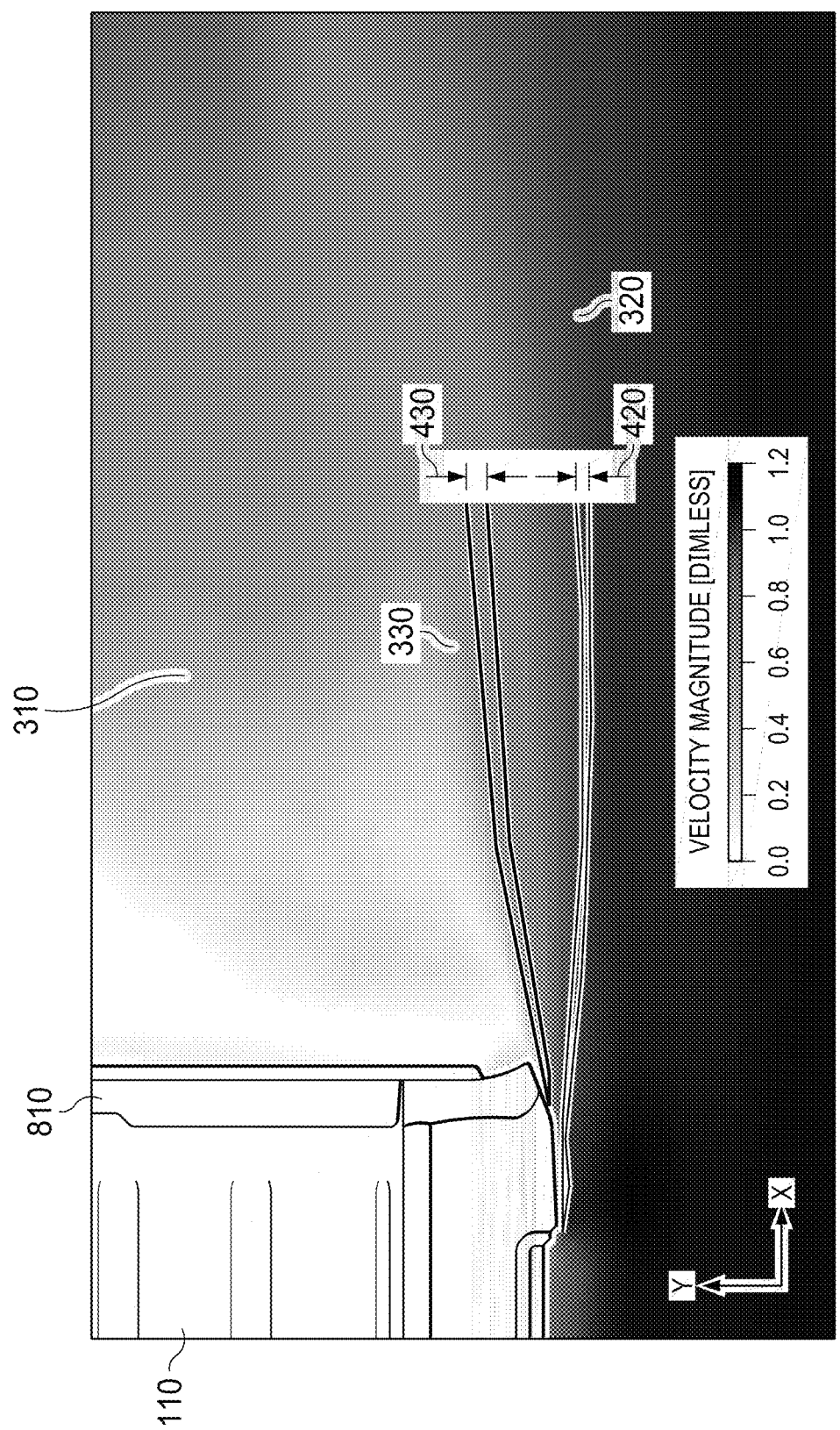
FIG. 8 is a top view of a velocity field output for a CFD run of an example vehicle, in accordance with at least one embodiment of the present disclosure.

FIG. 8 is a top view of a velocity field output 310 for a CFD run of an example vehicle 110, in accordance with at least one embodiment of the present disclosure. In this view of a countermeasure CFD run, an aerodynamic fairing 810 has been added to the rear of the vehicle 110. As a result of this addition, the color 1 transition 320 now falls well outside the expected range and the color 2 transition 330 now falls well outside the expected range 430. According to the method of the present disclosure, this indicates that the addition of the fairing 810 has meaningful aerodynamic effects, beyond what would be expected from run-to-run noise. This comparison may be made visually by a human or algorithmically by a processor or subroutine.

Figure 9:
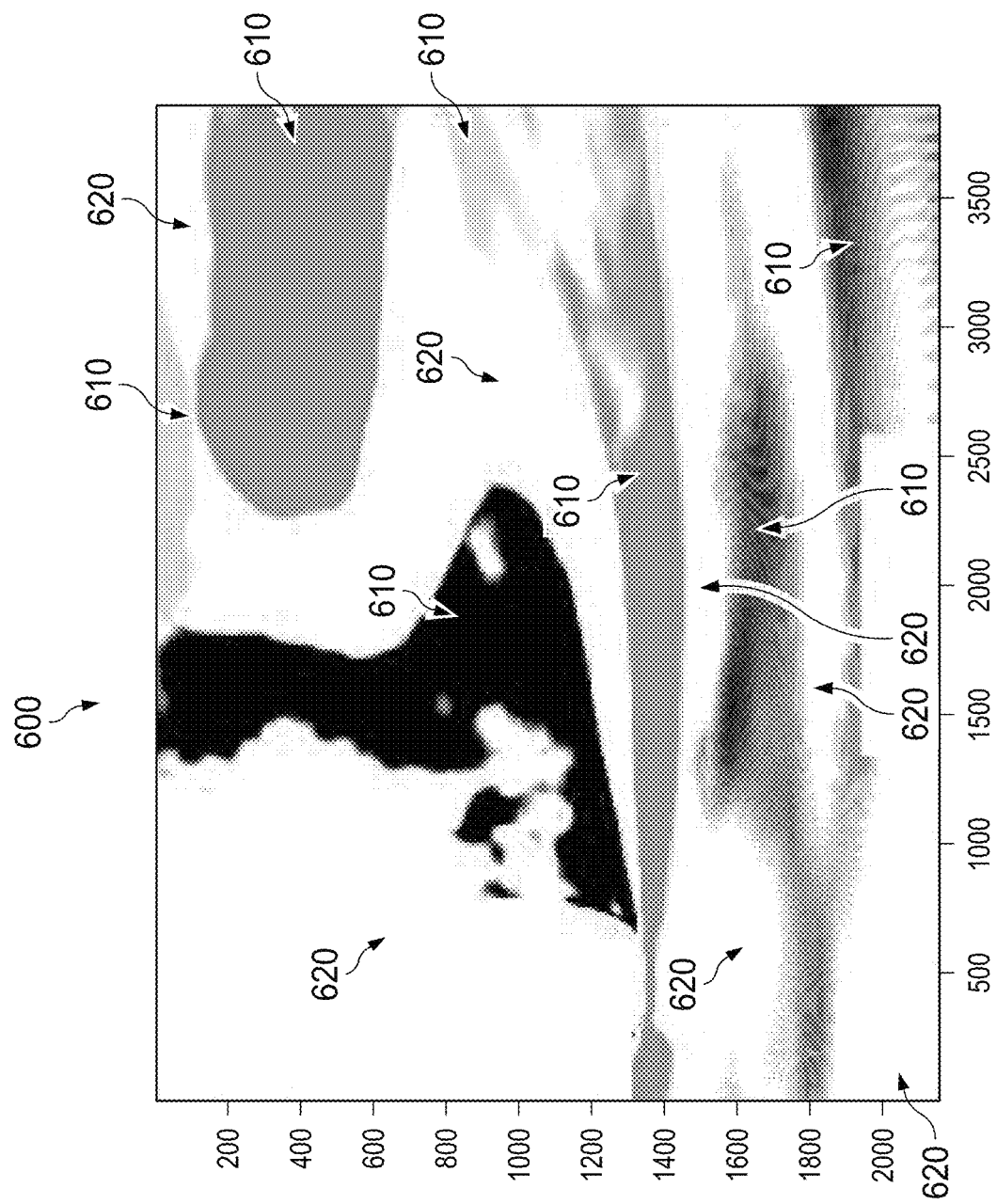
FIG. 9 is a velocity field subtraction image, in accordance with at least one embodiment of the present disclosure.

FIG. 9 is a velocity field subtraction image 600, in accordance with at least one embodiment of the present disclosure. The velocity field subtraction image 600 represents the velocity field 330 of one baseline case numerically subtracted from the velocity field 330 of a second baseline case, for the vehicle shown in FIG. 7 and FIG. 8. The subtraction image 600 includes colored regions 610 and white space 620 that represent a noise map, i.e., a 2D map showing where run-to-run variation occurs within the velocity field 330. This subtraction image 600 can for example be overlaid on top of the velocity field 330 of a countermeasure case, or compared against a subtraction image of the countermeasure case minus the baseline case. Any flow changes that occur in the colored or noisy regions 610 may be considered less consequential than changes that occur in the white space 620 of the subtraction image 600.

Figure 10:
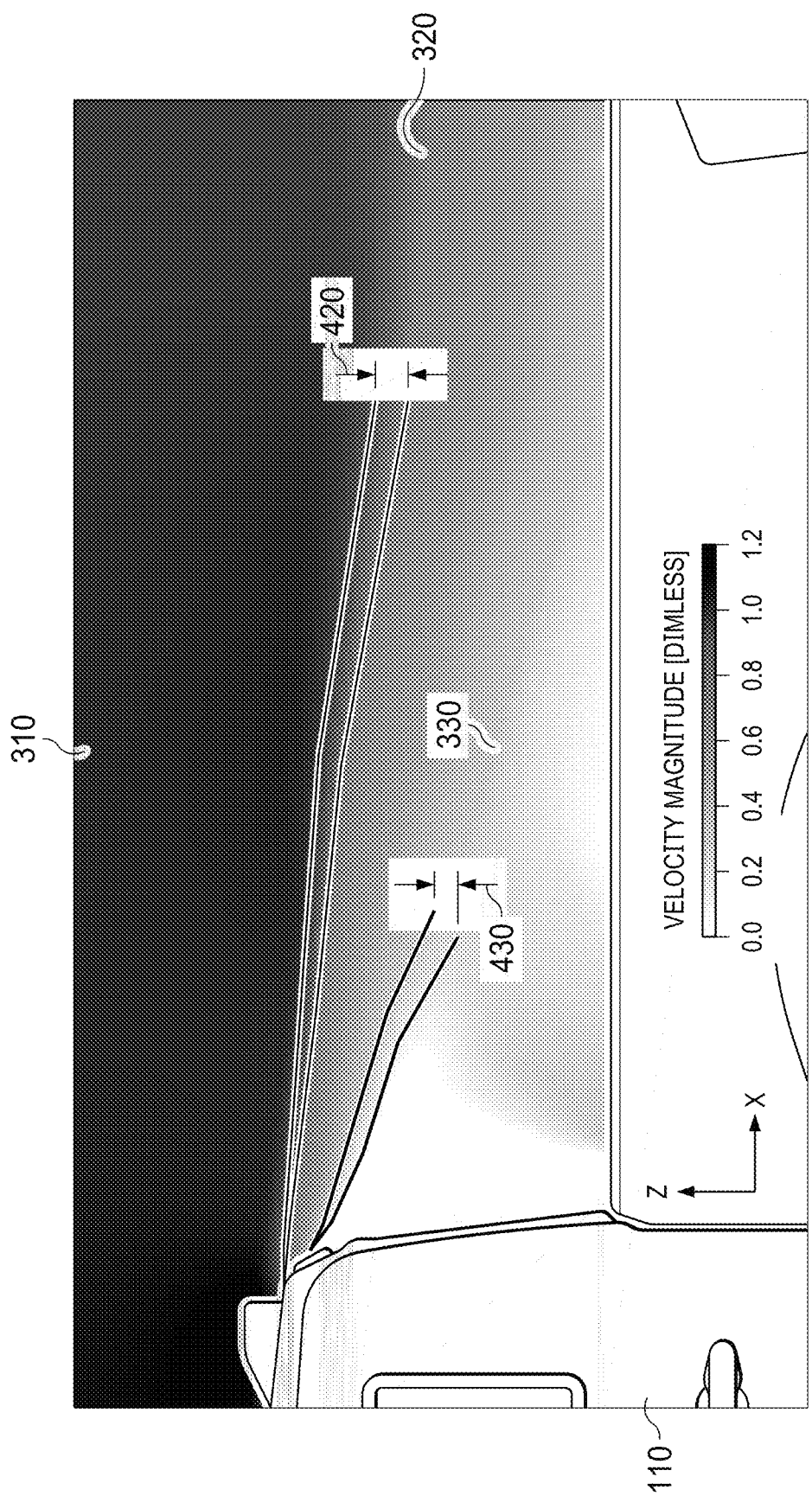
FIG. 10 is a top view of a velocity field output for a CFD run of an example vehicle, in accordance with at least one embodiment of the present disclosure.

FIG. 10 is a top view of a velocity field output 310 for a CFD run of an example vehicle 110, in accordance with at least one embodiment of the present disclosure. In this view of a baseline CFD run, the color 1 transition 320 falls on one edge of the expected range 420, and the color 2 transition 330 falls on one edge of the expected range 430, where the expected ranges were developed from two different baseline runs.

Figure 11:
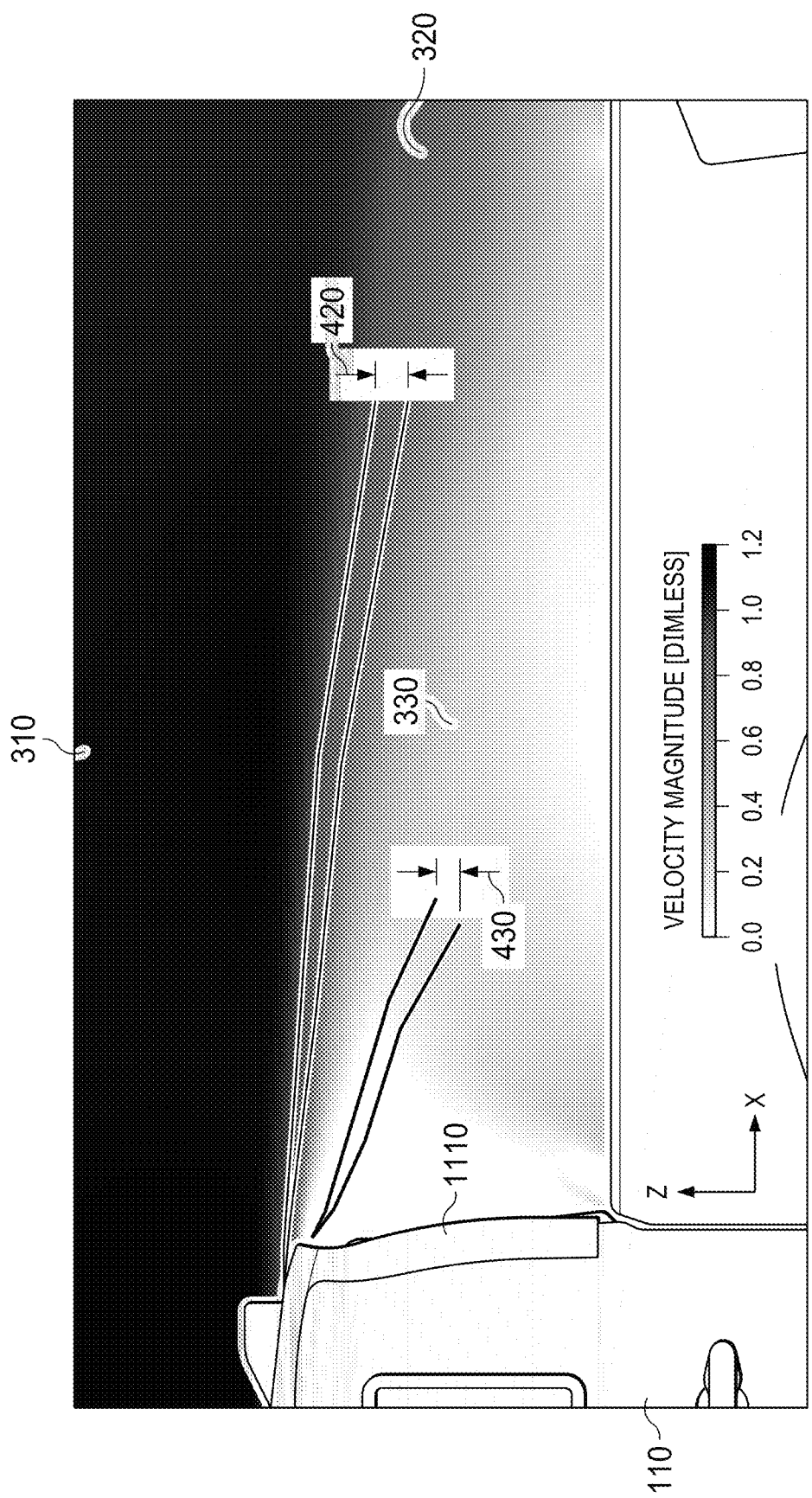
FIG. 11 is a top view of a velocity field output for a CFD run of an example vehicle, in accordance with at least one embodiment of the present disclosure.

FIG. 11 is a top view of a velocity field output 310 for a CFD run of an example vehicle 110, in accordance with at least one embodiment of the present disclosure. In this view of a countermeasure CFD run, an aerodynamic fairing 1110 has been added to the rear of the vehicle 110. As a result of this addition, the color 1 transition 320 now falls outside the expected range and the color 2 transition 330 now falls well outside the expected range 430. According to the method of the present disclosure, this indicates that the addition of the fairing 810 has meaningful aerodynamic effects, beyond what would be expected from run-to-run noise.

Figure 12:
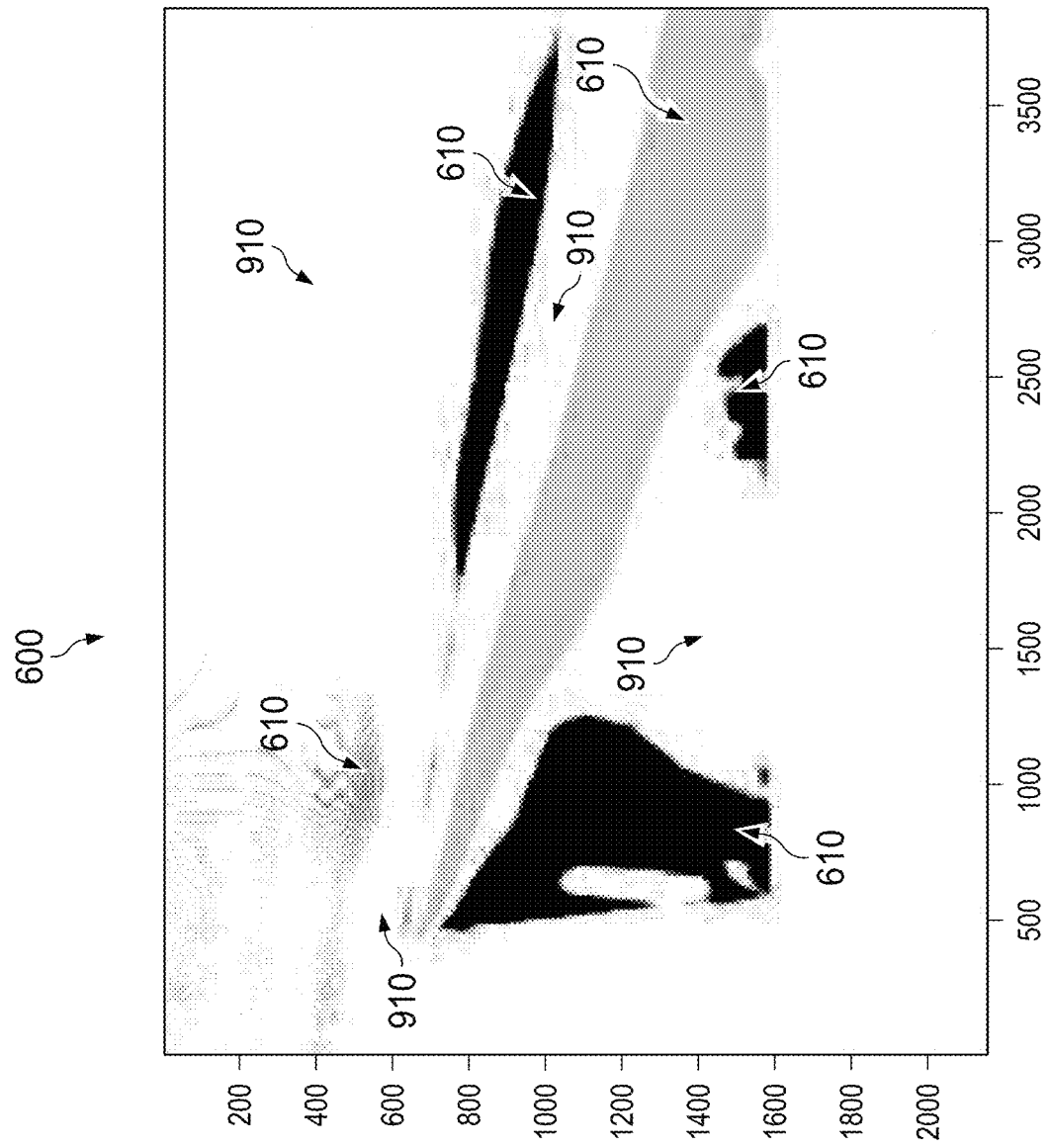
FIG. 12 is a velocity field subtraction image, in accordance with at least one embodiment of the present disclosure.

FIG. 12 is a velocity field subtraction image 600, in accordance with at least one embodiment of the present disclosure. The velocity field subtraction image 600 represents the velocity field 330 of one baseline case numerically subtracted from the velocity field 330 of a second baseline case, for the vehicle shown in FIG. 10 and FIG. 11. The subtraction image 600 includes colored regions 610 and white space 620 that represent a noise map, i.e., a 2D map showing where run-to-run variation occurs within the velocity field 330. This subtraction image 600 can for example be overlaid on top of the velocity field 330 of a countermeasure case, or compared against a subtraction image of the countermeasure case minus the baseline case. Any flow changes that occur in the colored or noisy regions 610 may be considered less consequential than changes that occur in the white space 620 of the subtraction image 600.

In some embodiments, a difference map is created by subtracting a baseline CFD run output (e.g., a velocity field) from a countermeasure CFD run output. The difference map can then be visually overlaid onto the noise map in order to identify regions of change that do not coincide with noise areas 610. These may be considered more meaningful than flow changes that occur within noise areas 610. In other embodiments, the noise map is subtracted from the difference map to yield an image showing only the "meaningful" flow changes resulting from a countermeasure or other change in vehicle body shape. Other variables that may be mapped and subtracted in this way include temperature, static pressure, dynamic pressure, velocity magnitude, velocity components, Lambda2, surface force, density, internal energy, kinetic energy, swirl, and vorticity.

Figure 13:
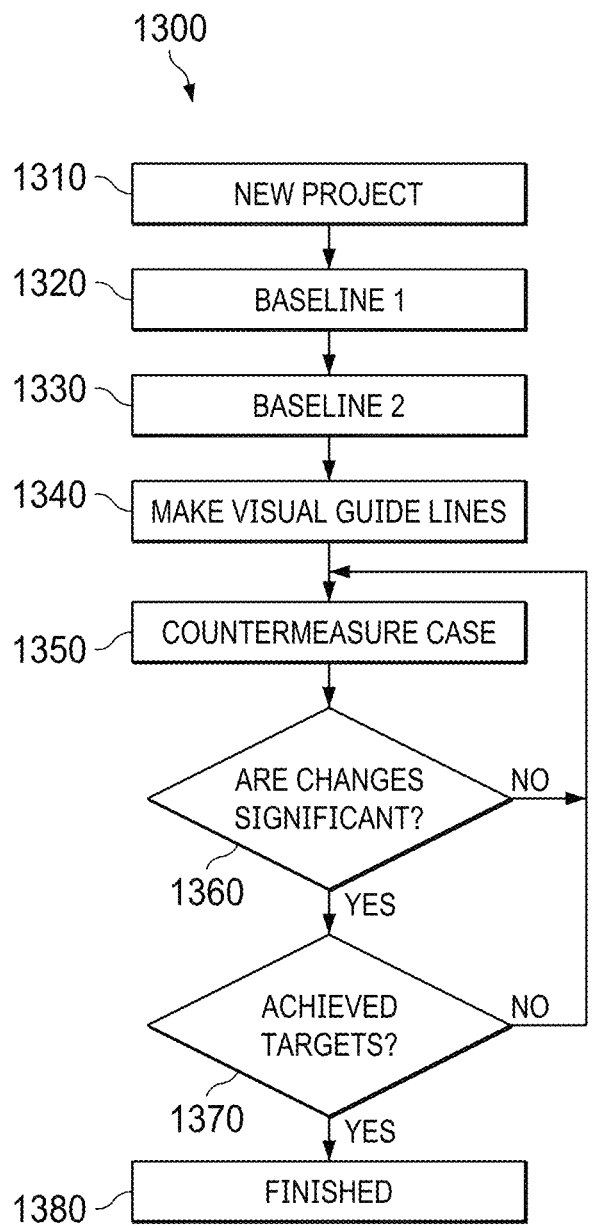
FIG. 13 is a flow diagram of a method for evaluating CFD results, in accordance with at least one embodiment of the present disclosure.

FIG. 13 is a flow diagram of a method for evaluating CFD results, in accordance with at least one embodiment of the present disclosure. In step 1310, the system begins by receiving from the user a new project involving a vehicle body shape 110 or portion of a vehicle body shape 110 to be simulated, along with a set of initial conditions (e.g., velocity, temperature, air density, etc.)

In step 1320, the method requires a baseline run to be performed on the vehicle body shape or portion of a vehicle body shape 110, using the initial conditions.

In step 1330, the method requires a second baseline run to be performed on the same vehicle body shape 110, using the initial conditions.

In step 1340, the method creates guide lines marking certain values within the CFD output field (e.g., iso velocity lines or iso pressure lines). This may be done automatically by an algorithm executing on a processor, based on the outputs of the two baseline CFD simulations in accordance with the method.

In step 1350, the system receives from the user a countermeasure case or change case, wherein a change is made to the vehicle body shape 110, and performs a CFD simulation using the same initial conditions as the two baseline cases.

In step 1360, the method determines whether the countermeasure CFD simulation has created flow differences that are outside the expected range of run-to-run variation as defined by the guide lines. If the changes are not significant (e.g., the new iso-velocity lines do not fall outside the guide lines), then the countermeasure is adjusted, and the method returns to step 1350. If the changes are significant, the method moves on to step 1370.

In step 1370, the system determines whether design targets have been achieved (e.g., drag reduction targets for a vehicle body shape 110). If the targets have not been achieved, then the countermeasure is adjusted, and the method returns to step 1350. If the design targets have been met, the method proceeds to step 1380 and is finished, with the final output being the change in vehicle body shape that achieves the design targets.

Figure 14:
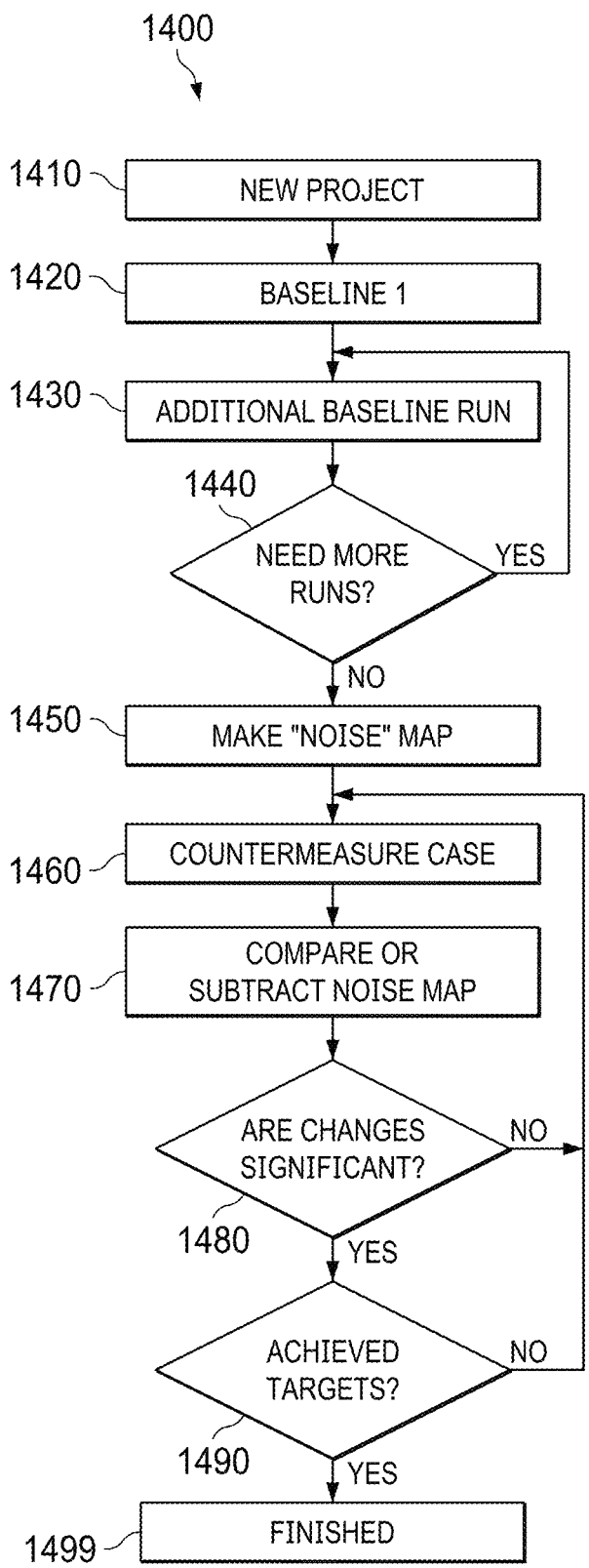
FIG. 14 is a flow diagram of a method for evaluating CFD results, in accordance with at least one embodiment of the present disclosure.

FIG. 14 is a flow diagram 1400 of a method for evaluating CFD results, in accordance with at least one embodiment of the present disclosure. In step 1410, the system begins a new project by receiving from the user a vehicle body shape 110 or portion of a vehicle body shape 110 to be simulated, along with a set of initial conditions (e.g., velocity, temperature, air density, etc.)

In step 1420, the method requires a baseline run to be performed on the vehicle body or portion of a vehicle body shape 110, using the initial conditions.

In step 1430, the method requires an additional baseline run to be performed on the same vehicle body shape 110, using the initial conditions.

In step 1440, the method determines whether additional baseline runs are to be performed. This may be done for example based on a test of statistical significance. In an example, when the most recent baseline run changes an average value or a standard deviation value by more than a threshold amount, it is highly desirable to perform an additional baseline run, if sufficient time or CPU resources exist to support this. In this case, the method returns to step 1430. Conversely, if the most recent baseline run changes an average value or a standard deviation value by less than a threshold amount, or if time or other resources do not permit additional baseline runs to be made, then the existing baseline runs are accepted as sufficient, and the method proceeds to step 1450.

In step 1450, a noise map is made for all points within the simulated area or volume. In some embodiments, this may be done for example by subtracting the lowest value at each point for any baseline run from the highest value at that point for any baseline run, to determine an expected range for that point. In other embodiments, the range may be determined by a standard deviation, or a set number of standard deviations, of all baseline values for that point. Other means are contemplated for computing the expected range, including averages, means, medians, maximum and minimum values, or maximum and minimum differences from a mean or median. The noise map can be displayed for example such that areas without run-to-run variation display as white or black space, and wherein areas with run-to-run variation are color-coded according to magnitude or severity of the run-to-run variation so that, for example, the smallest differences display as dark red whereas the largest differences display as bright blue, or vice versa, or other color schemes that serve to highlight the location, contours, and interrelationships of noisy and noiseless regions of the simulated area or volume.

In step 1460, the system received from the user a countermeasure case or change case, wherein the vehicle body shape 110 is altered to achieve a specific goal (e.g., drag reduction or turbulence reduction around a particular vehicle part). The results are simulated in the same manner and with the same initial conditions as the baseline cases described above.

In step 1470, a change map is created at each point within the simulated area or volume. In some embodiments, this may be done for example by subtracting the countermeasure at that point from the average of the baseline runs at that point. In some embodiments, the change map may then be compared against or overlaid upon the noise map created in step 1450, such that flow changes occurring in noisy regions of the simulated volume or area may be disregarded or may be regarded as less significant, whereas changes occurring in noiseless regions of the simulated area or volume may be regarded as more significant. In some embodiments, the noise map is subtracted from the change map such that, for example, 1× or 2× or 3× the absolute value of the standard deviation of noise at a given location is subtracted from the change map, with resulting values less than zero being treated as zero. The resulting noise-subtracted change map highlights only those points within the simulated area or volume where the countermeasure changes to the vehicle body shape 110 have produced changes to the mapped variable that exceed the expected run-to-run noise for that location for a given confidence interval (i.e., with 99.7% probability if 3× the standard deviation of the noise is subtracted, or with 95% confidence for 2× the standard deviation, or with 68% confidence for 1× the standard deviation). Variables that may be mapped and subtracted in this way include temperature, static pressure, dynamic pressure, velocity magnitude, velocity components, Lambda2, surface force, density, internal energy, kinetic energy, swirl, and vorticity.

In step 1480 the system determines whether the changes between the countermeasure case and the baseline are significant (e.g., whether they exceed the two-sigma noise value at any location). If the results are found to be significant, the method proceeds to step 1490. If the results are found to be insignificant, the vehicle body shape is further altered, and the method returns to step 1460.

In step 1490 the system determines whether design targets have been achieved (e.g., drag reduction targets for a vehicle body shape 110). If the targets have not been achieved, then the countermeasure is adjusted (i.e., the vehicle body shape is further modified), and the method returns to step 1460. If the targets have been met, the method proceeds to step 1499 and is finished, with the final output being the change in vehicle body shape that achieves the design targets.

FIG. 15 is an example algorithm 1500 for determining a noise map 600 for each point in the simulated area or volume, in accordance with at least one embodiment of the present disclosure. The expected range for any given point within the simulated area or volume is simply the average value for that location from the baseline runs, plus or minus one half the "base delta." If the number of baseline runs is equal to two, then the base delta is simply equal to the difference between value for that location from the two runs. If the number of baseline runs is greater than two (in this example, three baseline runs are used), then the example algorithm offers three different methods for calculating base delta. In the first option, the base delta is simple the largest difference in value for that point between any two of the baseline runs. This is the simplest and most conservative option, and results in the largest base delta. In the second option, the base delta is equal to the average of all the difference values between the multiple runs. The amount of calculation required for this method rises as the factorial of the number of baseline runs, so for large numbers of runs the calculation burden may be substantial. The third option is to compute a statistical value (e.g., a standard deviation or sigma, or else a two-sigma or three-sigma confidence interval) based on the values for that point in the various baseline runs. This is the most accurate and mathematically rigorous option, although it requires more calculation than Option 1, and may also require more calculation than Option 2 for small numbers of baseline runs, although it requires less for larger numbers of baseline runs.

FIG. 16 is an example algorithm 1600 for determining a noise-subtracted difference map for each point in the simulated area or volume, in accordance with at least one embodiment of the present disclosure. First, a base delta is computed as described above for FIG. 15. Next, a delta map or change map is computed as the difference between the value for each point in the countermeasure case and the first (or a representative) baseline case. In some embodiments, the delta map or change map is computed as the difference between the value for the change case and the average of the values for the various baseline cases. Next, the value at a given point is set to zero if the value change is less than the expected noise for that point within the simulated area or volume, and set to the value change if the value change is greater than the expected noise for that point.

Accordingly, it can be seen that the CFD noise map subtraction method fills a long-standing need in the art, by providing a method for engineers to quickly evaluate CFD results to determine whether they are meaningful results that exceed run-to-run noise, or whether they are relatively meaningless or trivial results that fall within the expected range of run-to-run noise.

The processor may comprise any combination of general-purpose computing devices, reduced instruction set computing (RISC) devices, application-specific integrated circuits (ASICs), field programmable gate arrays (FPGAs), or other related logic devices, including mechanical and quantum computers. In some embodiments, the processor comprises a memory in which instructions or information are stored, and the processor operates based on the instructions or information. The memory may be co-located on the same board or chip with processing elements or else located external to a board or chip containing processing elements. The memory may comprise any combination of read-only memory (ROM), programmable read-only memory (PROM), electrically erasable read-only memory (EEPROM), magnetic or electronic random access memory (RAM), flash memory, disk or tape drive, or other related memory types.

External communication (including but not limited to software updates, firmware updates, or outputs of the simulation) to and from the processor could be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information.

Internal communication within the processor may be through numerous methods or protocols. Serial communication protocols may include but are not limited to SPI, I²C, RS-232, RS-485, CAN, Ethernet, ARINC 429, MODBUS, MIL-STD-1553, or any other suitable method or protocol. Parallel protocols including but not limited to ISA, ATA, SCSI, PCI, IEEE-488, IEEE-1284, and other suitable protocols. Where appropriate, serial and parallel communications may be bridged by a UART, USART, or other appropriate subsystem.

A number of variations are possible on the examples and embodiments described above. For example, other variables may be simulated and analyzed than those described above. Alternatively, the technology described herein may be employed for other types of vehicles, including but not limited to aircraft and watercraft. The logical operations making up the embodiments of the technology described herein are referred to variously as operations, steps, objects, elements, components, or modules. Furthermore, it should be understood that these may occur in any order, unless explicitly claimed otherwise or a specific order is inherently necessitated by the claim language.

In some implementations, the simulation and its outputs may be two-dimensional. In other embodiments, the simulation and its outputs may be three dimensional or multidimensional. It should further be understood that the described technology may be employed with processors of diverse type, and displays including 2D, 3D, VR, AR, color, and monochrome displays.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the CFD noise map subtraction method. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the CFD noise map subtraction method as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A method for evaluating computational fluid dynamic and computer aided engineering simulation results, the method comprising:
with a processor comprising a memory:
providing a first vehicle body shape to be simulated;
providing a set of initial conditions;
performing a first baseline computational fluid dynamic simulation and a second baseline computational fluid dynamic simulation of a simulated area or volume containing the first vehicle body shape using the set of initial conditions;
performing a change computational fluid dynamic simulation using a second vehicle body using the set of initial conditions;
for each point within the simulated area or volume:
creating a noise subtraction image by numerically subtracting a second scalar field of the second baseline computational fluid dynamic simulation from a first scalar field of the first baseline computational fluid dynamic simulation;
creating a change subtraction image based by numerically subtracting a third scalar field of the change computational fluid dynamic simulation from a scalar field of a selected baseline computational fluid dynamic simulation selected from the first baseline computational fluid dynamic simulation or the second baseline computational fluid dynamic simulation; and
comparing the change subtraction image to the noise subtraction image.

2. The method of claim 1, wherein comparing the change subtraction image to the noise subtraction image involves discounting changes that occur in the change subtraction image at points where noise exists in the noise subtraction image.

3. The method of claim 1, wherein comparing the change subtraction image to the noise subtraction image involves disregarding changes that occur in the change subtraction image at points where noise exists in the noise subtraction image.

4. The method of claim 1, wherein comparing the change subtraction image to the noise subtraction image involves setting a value of the change subtraction image at each given point to zero if a value of the noise subtraction image at the given point is greater than the value of the change subtraction image at the given point.

5. The method of claim 4, wherein, after setting a value of the change subtraction image at each given point to zero if the value of the noise subtraction image at the given point is greater than the value of the change subtraction image, the change subtraction image shows only changes between the change computational fluid dynamic simulation and the selected baseline computational fluid dynamic simulation that exceed the value of the noise subtraction image.

6. The method of claim 5, wherein all of the changes shown in the change subtraction image, after setting a value of the change subtraction image at each given point to zero if the value of the noise subtraction image at the given point is greater than the value of the change subtraction image at the given point, the changes shown in the change subtraction image are all considered statistically significant.

7. The method of claim 1, further comprising:
performing additional baseline computational fluid dynamic simulations; and
for each point within the simulated area or volume:
creating the noise subtraction image based on a standard deviation of values from the first baseline computational fluid dynamic simulation, the second baseline computational fluid dynamic simulation, and the additional baseline computational fluid dynamic simulations; and
creating the change subtraction image based on differences between the change computational fluid dynamic simulation and an average of values from the first baseline computational fluid dynamic simulation, the second baseline computational fluid dynamic simulation, and the additional baseline computational fluid dynamic simulations,
wherein the selected baseline computational fluid dynamic simulation is an average of the first baseline computational fluid dynamic simulation, second baseline computational fluid dynamic simulation, and additional baseline computational fluid dynamic simulations, and wherein a value of the point for the selected baseline computational fluid dynamic simulation is the average of the value for the first baseline computational fluid dynamic simulation, the second baseline computational fluid dynamic simulation, and the additional baseline computational fluid dynamic simulations.

8. The method of claim 7, wherein comparing the change subtraction image to the noise subtraction image involves visually comparing the change subtraction image to the noise subtraction image, and discounting changes that occur in the change subtraction image at points where noise exists in the noise subtraction image.

9. The method of claim 7, wherein comparing the change subtraction image to the noise subtraction image involves visually comparing the change subtraction image to the noise subtraction image, and disregarding changes that occur in the change subtraction image at points where noise exists in the noise subtraction image.

10. The method of claim 7, wherein comparing the change subtraction image to the noise subtraction image involves setting a value of the change subtraction image at a given point to zero if the value of the noise subtraction image at the given point is greater than the value of the change subtraction image at the given point.

11. The method of claim 10, wherein, after setting a value of the change subtraction image at each given point to zero if the value of the noise subtraction image at the given point is greater than the value of the change subtraction image at the given point, the change subtraction image shows only changes between the change computational fluid dynamic simulation and the selected baseline computational fluid dynamic simulation that exceed the value of the noise subtraction image.

12. The method of claim 11, wherein, after setting a value of the change subtraction image at each given point to zero if the value of the noise subtraction image at the given point is greater than the value of the change subtraction image at the given point, all of the changes shown in the change subtraction image are considered statistically significant.

13. A system for testing the fluid dynamic characteristics of body shapes of a vehicle, the system comprising:
a processor comprising:
a memory;
a display; and
a user interface configured to receive inputs from a user,
wherein the processor is configured to:
receive a first body shape of a vehicle to be simulated;
receive a set of initial conditions;
perform a first baseline computational fluid dynamic simulation and a second baseline computational fluid dynamic simulation of a simulated area or volume containing the first body shape of the vehicle using the set of initial conditions;
perform a change computational fluid dynamic simulation using a second vehicle body shape using the set of initial conditions; and
for each point within the simulated area or volume:
create a noise subtraction image by subtracting a value of a scalar field for the second baseline computational fluid dynamic simulation from the value of the scalar field for the first baseline computational fluid dynamic simulation;
create a change subtraction image based by subtracting a value of the scalar field for the change computational fluid dynamic simulation from the value of the scalar field for a selected baseline computational fluid dynamic simulation selected from the first baseline computational fluid dynamic simulation or the second baseline computational fluid dynamic simulation; and
compare the change subtraction image to the noise subtraction image.

14. The system of claim 13, wherein comparing the change subtraction image to the noise subtraction image involves setting a value of the change subtraction image at each given point to zero if a value of the noise subtraction image at the given point is greater than the value of the change subtraction image.

15. The system of claim 14, wherein, after setting a value of the change subtraction image at each given point to zero if the value of the noise subtraction image at the given point is greater than the value of the change subtraction image, the change subtraction image shows only changes between the change computational fluid dynamic simulation and the selected baseline computational fluid dynamic simulation that exceed the value of the noise subtraction image.

16. The system of claim 15, wherein all of the changes shown in the change subtraction image, after setting a value of the change subtraction image at each given point to zero if the value of the noise subtraction image at the given point is greater than the value of the change subtraction image, the changes shown in the change subtraction image are all considered statistically significant.

17. The system of claim 13, wherein the processor is further configured to:
perform additional baseline computational fluid dynamic simulations; and
for each point within the simulated area or volume:
create the noise subtraction image based on a standard deviation of values from the first baseline computational fluid dynamic simulation, the second baseline computational fluid dynamic simulation, and the additional baseline computational fluid dynamic simulations; and
create the change subtraction image based on differences between the change computational fluid dynamic simulation and an average of values from the first baseline computational fluid dynamic simulation, the second baseline computational fluid dynamic simulation, and the additional baseline computational fluid dynamic simulations,
wherein the selected baseline computational fluid dynamic simulation is an average of the first baseline computational fluid dynamic simulation, second baseline computational fluid dynamic simulation, and additional baseline computational fluid dynamic simulations, and wherein a value of the point for the selected baseline computational fluid dynamic simulation is the average of the value for the first baseline computational fluid dynamic simulation, the second baseline computational fluid dynamic simulation, and the additional baseline computational fluid dynamic simulations.

18. The system of claim 17, wherein comparing the change subtraction image to the noise subtraction image involves setting a value of the change subtraction image at each given point to zero if a value of the noise subtraction image at the given point is greater than the value of the change subtraction image.

19. The system of claim 18, wherein, after setting a value of the change subtraction image at each given point to zero if the value of the noise subtraction image at the given point is greater than the value of the change subtraction image, the change subtraction image shows only changes between the change computational fluid dynamic simulation and the selected baseline computational fluid dynamic simulation that exceed the value of the noise subtraction image.

20. The system of claim 13, further comprising the vehicle.

* * * * *